July 9, 1940.   G. T. CLEMENS   2,207,050
VARIABLE DIFFUSION MECHANISM FOR CAMERAS
Filed June 8, 1938   2 Sheets-Sheet 1

Inventor
George T. Clemens,
By Arthur P. Knight and Alfred W. Knight
Attorneys

July 9, 1940. G. T. CLEMENS 2,207,050
VARIABLE DIFFUSION MECHANISM FOR CAMERAS
Filed June 8, 1938 2 Sheets-Sheet 2

Inventor
George T. Clemens,

By Arthur P. Knight and
Alfred W. Knight

Attorneys

Patented July 9, 1940

2,207,050

UNITED STATES PATENT OFFICE

2,207,050

VARIABLE DIFFUSION MECHANISM FOR CAMERAS

George T. Clemens, Los Angeles, Calif.

Application June 8, 1938, Serial No. 212,537

5 Claims. (Cl. 88—19.3)

The present invention relates generally to motion picture cameras, and more particularly to cameras, and shutter mechanisms therefor, adapted to modify all or a part of the light passing the rotary shutter, as by diffusing, or altering the color values in, the light that reaches the film.

It is a well-known part of motion picture technique to diffuse to a greater or lesser extent the light reaching the film in order to soften the outlines of the recorded images and to achieve pleasing and artistic results. Heretofore this has been accomplished by placing light-diffusing members in front of the camera lens, these members usually being discs of glass suitably prepared to effect a desired degree of diffusion. Different degrees of diffusion are achieved by using different discs, since each individual disc is not variable and produces only one degree of diffusion. Because of the particular advantages of my invention when applied to diffusion means, I show and describe my invention as applied in this connection, but it will be understood that it is not limited thereto.

All fixed or constant diffusion elements of this type have a very serious shortcoming in that they give the correct amount of diffusion only at one fixed distance of the object from the camera, because the diffusion effect changes with a change in focus of the lens. Consequently, in "follow" shots where the camera moves for a considerable distance, as from a medium long shot to a close-up in a single scene, the correct diffusion at the start is quite inadequate at the finish, and the correct diffusion for the close-up is far too much for the beginning. Because the camera is in continuous operation as it moves toward the objects being photographed, the camera man has no opportunity to change the diffusion members during a single, continuous scene, and the common practice has been to compromise on the amount of diffusion used, by providing a degree of diffusion that is correct for the average distance of the shot. This method is merely an expedient to achieve the best results possible under existing circumstances, but is still unsatisfactory for the best class of work because it still produces too much diffusion on the long shots and not enough on the final close-up, when there is any material change in focus during the single scene.

A part of these difficulties have been overcome to some extent by the use of a sliding diffusion screen in front of the camera lens, the amount of diffusion produced by the screen being variable along its length. While this arrangement provides some control by the camera man over the amount of diffusion produced and permits him to change it along with the changing focus of the lens, yet objection to this type of mechanism is that it sometimes fails to produce an even diffusion over the entire exposed portion of the camera film. This result is a consequence of a screen so made that the diffusion produced varies rapidly from one end of the screen to the other, and consequently for any material width of the diffusing screen, such as the width interposed in front of the camera lens, there is an appreciable difference between the diffusion produced at one side of the lens and that produced at the other side of the lens.

All diffusing elements placed in front of the camera lens are objectionable because of the relatively high light loss caused by light absorption in the diffusing element, and the necessity of keeping the diffusing element shaded from the sun or lights. Of course, the more complicated the diffusing element is made in order to overcome its other shortcomings, the greater is the light loss incurred. Not only does light absorption to an appreciable extent by the diffusion element vitiate to an equal extent the value of high speed lenses and emulsions, but also, when the maximum light loss is appreciable, it is extremely difficult for the camera man to compensate for the material variations in light reaching the film during a single scene.

Diffusion elements in front of the lens must be shielded from direct rays from the sun or artificial lights since these rays striking the diffusion elements cause halation effects on the film. Shielding these elements is not always easy when the camera position and angle is changing, and adds greatly to the difficulties of a camera man who already has many things to watch. For these reasons a variable diffusion element placed in front of the camera lens has inherent objections.

As has been stated, the purpose of diffusing the light is to produce pleasing and artistic pictures; and it has been found that this effect is heightened by exposing the film for a portion of the time without any diffusion. A negative or positive print made this way has a greater contrast and richness of tone than one subjected to diffusion for the entire exposure period, for the latter, if exposed over long to obtain contrast, is blurred so much as to result in the undesirable appearance of being out of focus. The advantages of part time diffusion have been unobtainable with any heretofore known diffusion devices for motion picture cameras because they are stationary and do not move in synchronism with the shutter elements.

It thus becomes a general object of my invention to provide means in a motion picture camera for securing a variable amount of modification, as by diffusing or filtering, of the light reaching the film, the modifying means being gradually variable in effect while the camera is in continuous operation and fully under the control of the camera man at all times.

Another main object is to provide a movable diffusion element synchronized with the shutter that affords a diffusive effect for only a portion of the exposure time of each negative.

It is also an object of my invention to provide means in a motion picture camera for securing a variable amount of light diffusion which produces a diffusive effect that is uniform over the entire area of the film exposed.

A further object of the invention is to provide a variable diffusion means for a motion picture camera which absorbs a minimum amount of light and consequently produces only a negligible difference in the amount of light reaching the film as the diffusion member is moved into operative position, and which is permanently shielded from undesired direct light rays.

An additional object is to provide means in a motion picture camera for securing variable diffusion in the light reaching the film, the means being variable from no diffusive effect to a maximum diffusive effect, at which latter point the diffusion may be sufficiently great to dissolve the picture, thus combining diffusion and dissolve effects.

These objects are accomplished in a motion picture camera having an opaque rotary shutter leaf or cut-away disc that intermittently admits light to the film, by providing an auxiliary leaf or cut-away disc that normally fully overlaps the opaque shutter leaf and rotates in unison therewith, but which, upon being rotated relative to the opaque leaf, is moved partly or entirely into a variable non-overlapping relation with respect to the shutter leaf. The auxiliary leaf of my invention is of light-transmitting and light-modifying material. The light admitted to the film by the shutter leaf passes through a greater or lesser portion of the auxiliary leaf, according to the amount of the latter that does not overlap the opaque shutter leaf, and the light transmitted through the auxiliary leaf is modified according to the light-modifying characteristics of the material forming the leaf.

Suitable materials for the auxiliary leaf include glass, Celluloid, synthetic resins of which one is well known by the trade name of "Lucite," and similar light-transmitting materials that transmit substantially all the incident light. When the leaf is used for diffusion only, a colorless transparent material is preferably used and the surface of the leaf is roughened or made irregular in any suitable manner and to such extent that the light incident on the leaf surface is diffused as it is transmitted through the leaf. The amount of diffusion imparted to the transmitted light depends upon the nature of this roughened surface. The total amount of diffusion imparted to the total light reaching the film to be exposed depends upon the total extent of the auxiliary leaf in the open part of the opaque shutter leaf, and the total diffusion may be increased or decreased respectively by increasing or decreasing the amount of the auxiliary leaf in non-overlapping relation with the opaque leaf.

When the auxiliary leaf covers the entire open portion of the shutter, all the light reaching the film is transmitted through the auxiliary leaf and is diffused; and, if the diffusion is sufficiently great, the diffusion leaf can now be used to dissolve the picture in the same manner as dissolve the shutter mechanisms comprising a plurality of opaque leaves.

As a variation of my invention, the light-modifying material of the auxiliary disc may be a color-filter material that changes the color values of the light transmitted by the auxiliary leaf and reaching the film. In this instance, the surface of the leaf may be entirely smooth to avoid any diffusive effect, or the surface may be roughened as mentioned above in order that the light-modifying material may have characteristics that modify the transmitted light both by diffusing it and by altering its color values.

Although the invention is not limited thereto, a preferred embodiment of my invention is structurally similar to the dissolve shutter mechanism of a well-known type illustrated by U. S. Patent No. 1,297,703 granted March 18, 1919 to J. E. Leonard, and consequently I hereinafter show and describe the invention in conjunction with this type of shutter driving mechanism. However, from the following exposition of the general principles of my invention, it will be understood how the invention may be adapted to other types of rotary shutter driving mechanisms.

How the above objects and advantages of my invention, as well as others not specifically mentioned, are attained will be more fully understood by reference to the following description and the annexed drawings, in which.

Figure 1:
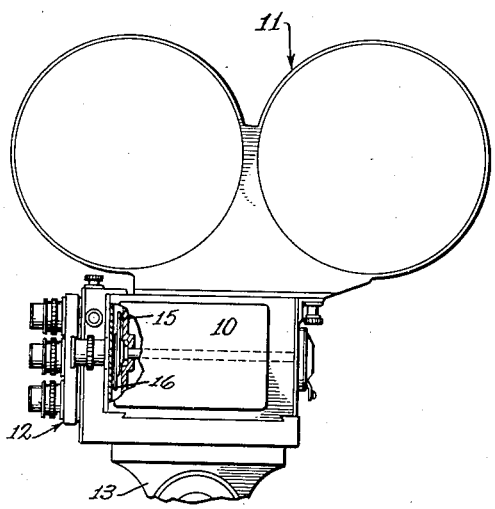
Fig. 1 is a side elevation of a motion picture camera with parts broken away to show the location of the light-modifying shutter mechanism.

Referring now to the drawings, there is indicated at 10 a motion picture camera case which carries a film magazine 11 and a lens turret 12, the whole being supported on a tripod head 13. Rotatably mounted within the camera case is a shutter leaf 15 and an auxiliary shutter leaf 16. As the opaque shutter 15 rotates, it intermittently allows light to pass and reach an intermittently moved photographic film (not shown) which is to be exposed, as is well known in the art.

Auxiliary leaf 16 is mounted on the forward end of rotating shaft 18 which is journaled within hollow sleeve 19. Opaque leaf 15 is attached to a hub 20 keyed to the forward end of a sleeve 19 which is journaled at its forward and rearward ends in bearings in the camera case 10. The shutter driving mechanism may be any suitable mechanism adapted to drive shaft 18 and sleeve 19 together as a unit in order that the two leaves 15 and 16 can be rotated in unison, that is, they rotate together maintaining themselves in any predetermined fixed position relative to each other. The driving mechanism is also provided with means, either manually or mechanically actuated, for relatively rotating the shaft and sleeve in order to effect relative rotation of leaves 15 and 16 with respect to each other. The shutter driving mechanism herein shown and described is typical of mechanisms that may be used and embody these means, but it will be clear that any other suitable type of driving mechanism having like characteristics may be used instead.

Figure 3:
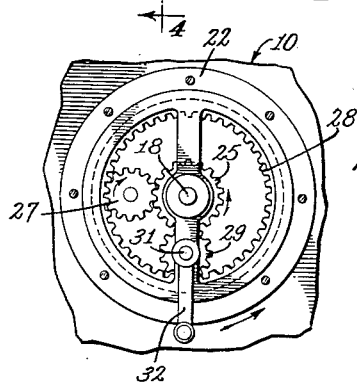
Fig. 3 is a fragmentary elevation taken on line 3—3 of Fig. 2.

Shaft 18 and sleeve 19 terminate at the rear in a gear case 22 set in the rear wall of camera 10. The end of sleeve 19 is provided with pinion 24 while on a portion of shaft 18 extending beyond the sleeve is pinion 25 which is coaxial of and of the same diameter as pinion 24. Idler gear 27 meshes with pinion 24 and with internal gear 28, as shown in Fig. 3. Idler 27 rotates on a fixed pin attached to the face of gear case 22. Pinion 25 meshes with a second idler gear 29 rotatably mounted on a shaft 31 carried by lever arm 32. Idler 29 is of the same diameter as idler 27 and also meshes with internal gear 28. The upper end of lever arm 32 is supported on the extreme rear end of shaft 18 by a journal bearing to permit free revolution of the shaft with respect to the lever arm, while the lower end of the arm projects outwardly through a slot in cover plate 34 attached to gear case 22.

The shutter mechanism is driven from bevel gear 35 which engages bevel gear 36 attached to sleeve 19. Power is supplied to driving gear 35 through a gear train from an electric motor, not shown, or other suitable source of power, adapted to drive gear 35 in synchronism with the film-moving mechanism and the film itself. As drive gear 35 rotates, it turns gear 36 and sleeve 19. Rotation of sleeve 19 transmits motion from pinion 24 through idler 27 to internal gear 28 which rotates in the opposite direction to the sleeve. Rotation of internal gear 28 causes idler 29 to turn and drive pinion 25 attached to shaft 18, and thus shaft 18 is driven in unison with sleeve 19. In this way, shutter leaf 15 on sleeve 19 and auxiliary leaf 16 attached to shaft 18 are driven in unison and in synchronism with the intermittent advance movement of the photographic film. The two leaves maintain any set position with respect to one another.

Figure 2:
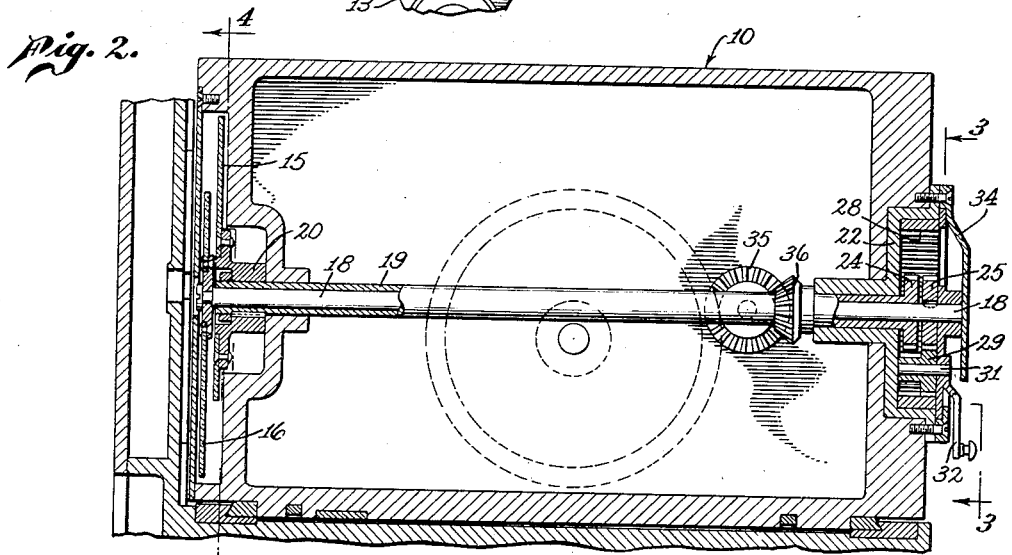
Fig. 2 is an enlarged fragmentary view in vertical section showing the opaque shutter leaf and diffusion leaf and a typical drive means therefor.
Figure 4:
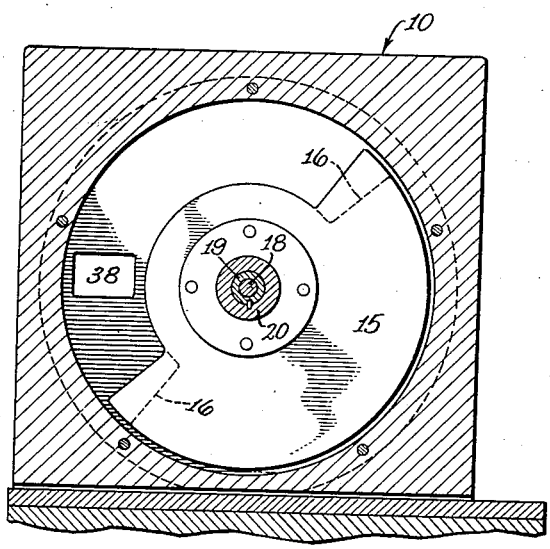
Fig. 4 is a vertical section on line 4—4 of Fig. 2 showing an opaque shutter leaf in elevation and an auxiliary diffusion leaf in normal fully overlapping relation, and the relative positions of these two leaves with respect to a photographic aperture.
Figure 5:
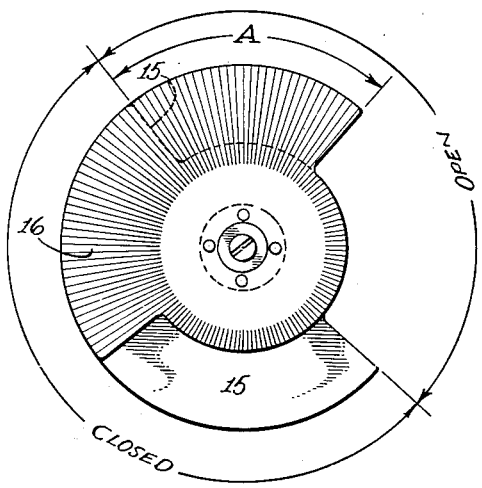
Fig. 5 is an elevation of the shutter and auxiliary leaves, viewed from the other side than in Fig. 4, after the two leaves have been rotated with respect to one another.

As may be seen from Figs. 2 and 4, shutter leaf 15 is a thin, disc-like element interposed between photographic aperture 38 in the forward end of camera case 10 and the film which is to be exposed, the shutter being of opaque material, usually metal. While the rotating shutter 15 covers aperture 38, the aperture is closed and no light reaches the film, it being during this period that the film is moved down into position for a new exposure. A segment of the shutter disc is cut away to open aperture 38 for the portion of each revolution of the shutter marked "open" in Fig. 5, and during this open period light through aperture 38 reaches the stationary film for an exposure. Although the lengths of the periods during which aperture 38 is opened and closed may differ considerably in different types and kinds of motion picture cameras, the shutter 15 illustrated in Figs. 4 and 5 is typical of many well-known cameras. The period during which the aperture is opened is, as indicated in Fig. 5, determined by the length of the cut-away segment of the shutter. This is usually about half of the shutter and is here shown as being approximately 170°. During the remainder of each shutter revolution, represented by the full-diameter portion of the shutter, aperture 38 is closed, as indicated in Fig. 5. This full-diameter portion of the shutter extends over an arc of approximately 190°.

Auxiliary shutter leaf 16 is mounted coaxially of shutter leaf 15 and adjacent thereto, and may be located between the opaque shutter leaf and the film in the camera instead of in front of the opaque leaf as shown here. The auxiliary leaf is shaped in general similarly to the shutter leaf 15 and is a disc-like member with a cut-away portion, so that the auxiliary leaf may be interposed in front of aperture 38 for only a portion of each revolution. From considerations that will later become more fully apparent, the full-diameter portion of leaf 16 is preferably substantially equal to the cut-away portion of shutter 15, that is, it has an arc of 170°. It can of course be less than this by any desired amount, and it can be greater than 170° although it should not exceed 190°, which is the size of shutter 15, because if the auxiliary leaf exceeds the arc of the shutter leaf then at least a portion of the auxiliary leaf modifies light passing through aperture 38 at every revolution of the shutter mechanism. It may be stated, in general, that the length of the auxiliary leaf is determined by the arcuate length of the cut-away portion of shutter 15 marked "open" in Fig. 5.

Auxiliary leaf 16 may be made from a wide range of material depending upon the light-modifying characteristics that are desired. When the leaf is used only to secure diffusion, it is preferably made of a colorless, transparent synthetic resin, as this material absorbs very little light, has high mechanical strength, is of low density, and is shatter-proof. Another advantage of this material is that it lends itself easily to suitable surface treatment. As typical of such surface treatment as may be utilized to secure the desired diffusion, disc 16 in Figs. 1 and 5 is shown as having a number of fine radial lines or indentations on its surface. Of course, the lines may be placed in other directions than radial, and other more complicated geometric designs may be used that produce substantially uniform diffusive effect over the entire leaf 16; or the surface may be formed instead with a number of round depressions or indentations. Likewise, the surface may be roughened as by sandblasting, and this last method is particularly applicable in the event that glass is used as the material for the leaf, because the glass easily may be "frosted" by sandblasting or otherwise etching the surface. Another method found practical is to coat the leaf with a clear lacquer or similar material producing a slightly uneven surface. These treatments, alone or in combination, may be applied to either surface of the leaf, that is, the surface toward or away from aperture 38; or, under some circumstances it may be desired to treat both leaf surfaces either in the same or in different ways.

Under what may be termed normal circumstances, that is, when no diffusion is desired, both shutter leaves 15 and 16 are rotated in unison in fully overlapping relationship as illustrated in Fig. 4. In this position the opaque shutter 15 fully masks the diffusion disc 16 and the net result is the same as if only the opaque shutter were present.

When it is desired to secure diffusion of the light reaching the film, lever arm 32 is moved, as to the right in Fig. 3. Movement of lever arm 32 causes idler 29 to rotate about shaft 31, and the rotation of the idler gear causes a rotation of pinion 25 affixed to shaft 18. Internal gear 28 and sleeve 19 remain stationary and the rotation of shaft 18 causes a relative rotation of shutter leaves 15 and 16 that has the effect of advancing the light-modifying leaf until a greater or lesser portion of it is no longer in overlapping relation with opaque leaf 15, as is shown in Fig. 5. The portion of leaf 16 which is advanced beyond the edge of shutter 15 is indicated by the angle A in Fig. 5, and it is this exposed or unmasked portion of the auxiliary leaf that now transmits light to the film during a portion of each revolution of the shutter mechanism. Obviously, the amount of diffusion imparted to light transmitted through leaf 16 depends upon the light-modifying characteristics in the leaf itself. However, the total amount of diffusion imparted to the total light passing the shutter 15 and reaching the film during the period of each revolution indicated by the portion of the shutter marked "open" in Fig. 5, depends upon the relative value of the angle A. Thus if angle A is relatively small compared with the total angle of opening of the shutter, then only a small portion of the total light passing the shutter is diffused. On the other hand, if angle A is relatively large, then a correspondingly larger portion of the total light is modified by the characteristics of auxiliary leaf 16. For each portion of the exposure period measured by the difference between "open" portion of shutter 15 and angle A, the light reaching the film is not diffused. When the angle A by which the auxiliary leaf is advanced beyond the edge of the shutter equals the total cut-away or open portion of shutter 15, then all of the light passing the shutter is transmitted through the auxiliary leaf and subjected to the light modification imparted by the leaf.

The light-modifying character of auxiliary leaf 16 is substantially uniform over its entire area, and variation in the total amount of modification is achieved by varying the amount of the diffusing element which is operative. In this way the diffusion effect is uniform over the entire opening 39 and there is no perceptible difference between the diffusion given to one portion of the photographic image and the diffusion given to any other portion of the photographic image. The movable diffusion member is always synchronized with the shutter and film, regardless of how much is operative, and all the advantages of part time diffusion for each exposure are obtained. A further advantage of my invention lies in the fact that the light-modifying member is placed between the lens system and the film to be exposed. In this position tests and widespread experience have indicated that the total amount of light absorbed by the diffusing elements is much less than when the diffusing elements are placed in front of the camera lens.

Figure 6:
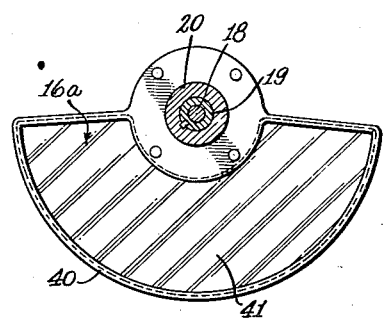
Fig. 6 is an elevation of a variational form of auxiliary leaf of color-filter material.

A variational form of auxiliary leaf 16a is illustrated in Fig. 6. This particular type of construction is especially adapted to the use of glass as the light-modifying material, and illustrates how a metal reinforcing rim 40 may be placed around the periphery of the sheet of glass 41 to provide added mechanical strength. This construction may be used when the auxiliary leaf is made of a color-filter material, for example, colored glass, which has been found particularly satisfactory for this type of material. The light-modifying character of the auxiliary leaf then is such as to change the color values of the transmitted light by filtering out to a greater or lesser extent certain wave-lengths of the light, and transmitting the remainder to the film. When a change in color values is the only modification of the light desired, then the surface of auxiliary leaf 16a is perfectly smooth, as shown in Fig. 6. However, it will be understood that the surface of glass plate 41 may be suitably treated or roughened to add a diffusive effect to the transmitted light. Leaf 16a may be substituted for the leaf 16 in Figs. 1–5, and the remainder of the mechanism and its operation is then the same as has been previously described.

After having described a present preferred embodiment of my invention, it will be apparent that various changes in structure and arrangement of parts may occur to those skilled in the art, and that these changes may be made without departing from the spirit and scope of my invention. Consequently, I wish it understood that the foregoing description is to be considered as illustrative of, rather than limitative upon, the scope of the invention as defined by the appended claims.

I claim:

1. A shutter mechanism for a motion picture camera comprising two normally overlapping shutter leaves, one of the leaves being opaque and the other being of light-transmissive material adapted to diffuse light passing through the leaf; means adapted to rotate both leaves in unison; and means for advancing one of the leaves relatively to the other while both leaves are being rotated by said last-mentioned means to place at least a portion of the light-transmissive leaf in non-overlapping relation to the opaque leaf.

2. A shutter mechanism for a motion picture camera comprising two normally overlapping shutter leaves, one of the leaves being of opaque material and the other being of light-transmissive material adapted to diffuse the light transmitted by the leaf; means adapted to rotate both leaves in unison; and means for advancing one of the leaves relatively to the other to place at least a portion of the light-transmissive leaf in non-overlapping relation to the opaque leaf.

3. A shutter mechanism for a motion picture camera comprising two normally overlapping shutter leaves, one of the leaves being of opaque material and the other being of light-transmissive material having a roughened surface adapted to diffuse the light transmitted by the leaf; means adapted to rotate both leaves in unison; and means for advancing one of the leaves relatively to the other to place at least a portion of the light-transmissive leaf in non-overlapping relation to the opaque leaf.

4. In a motion picture camera, the combination of a light aperture; a rotary shutter disc interposed between the aperture and film to be exposed; a rotary light-diffusing disc adjacent and coaxial of the shutter disc; means adapted to rotate both said discs in unison; and means to rotate the light-diffusing disc relative to the shutter disc while both discs are being rotated in unison to diffuse at least in part the light passing the shutter disc.

5. A shutter mechanism for a motion picture camera comprising an opaque leaf having a cut-away portion for passing light intermittently through the shutter; a second leaf having a portion of light-transmitting material adapted to diffuse light transmitted by the leaf and of a size to substantially cover the cut-away portion of the opaque leaf, the light-diffusive characteristics of the second leaf being substantially uniform over the area capable of covering the cut-away portion of the opaque leaf; said two leaves normally being in overlapping relation; means to rotate both leaves in unison; means for advancing one of the leaves relative to the other out of overlapping relation while both are rotating to place at least a part of the light-diffusing leaf in the cut-away portion of the opaque leaf.

GEORGE T. CLEMENS.